UNITED STATES PATENT OFFICE.

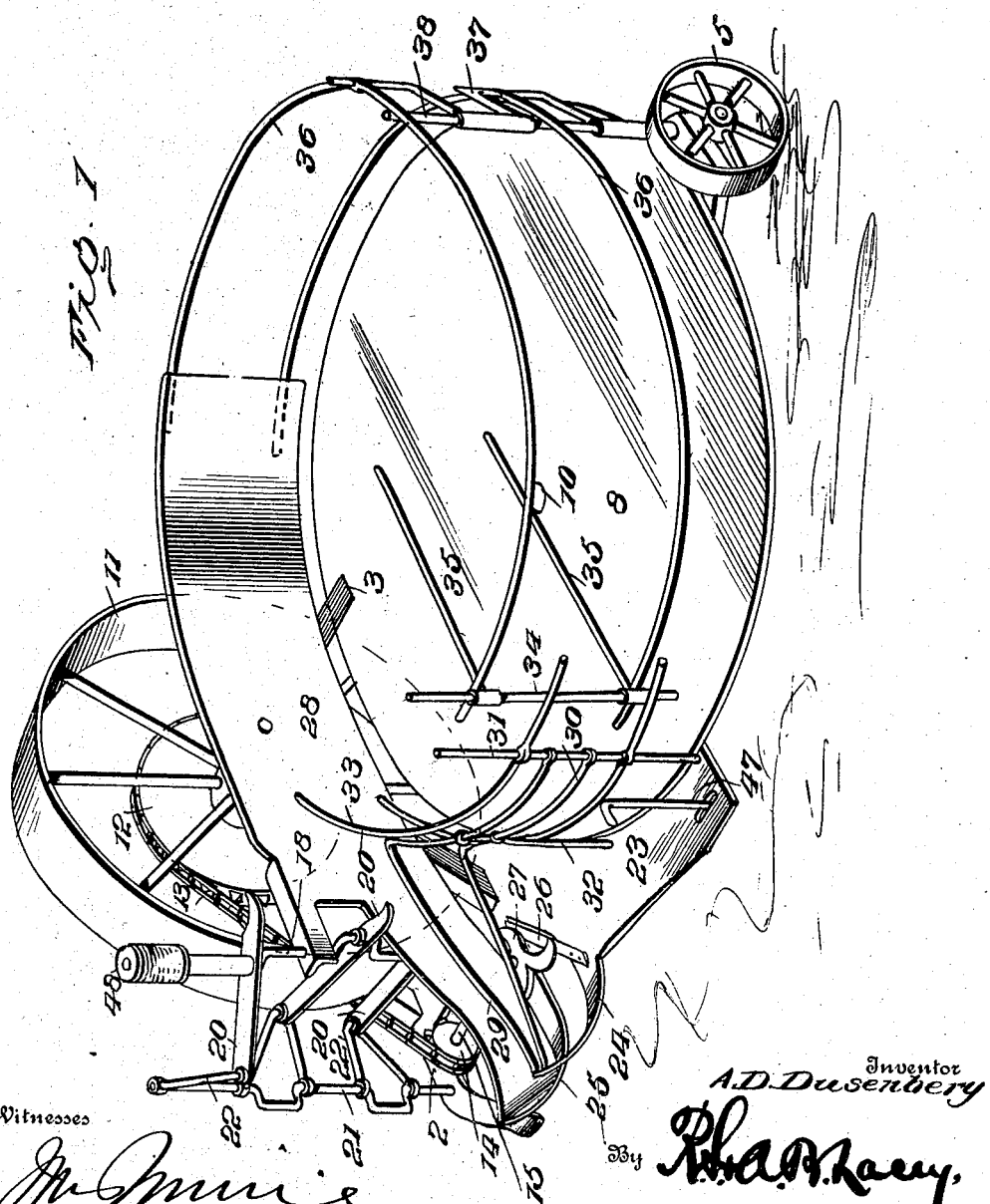

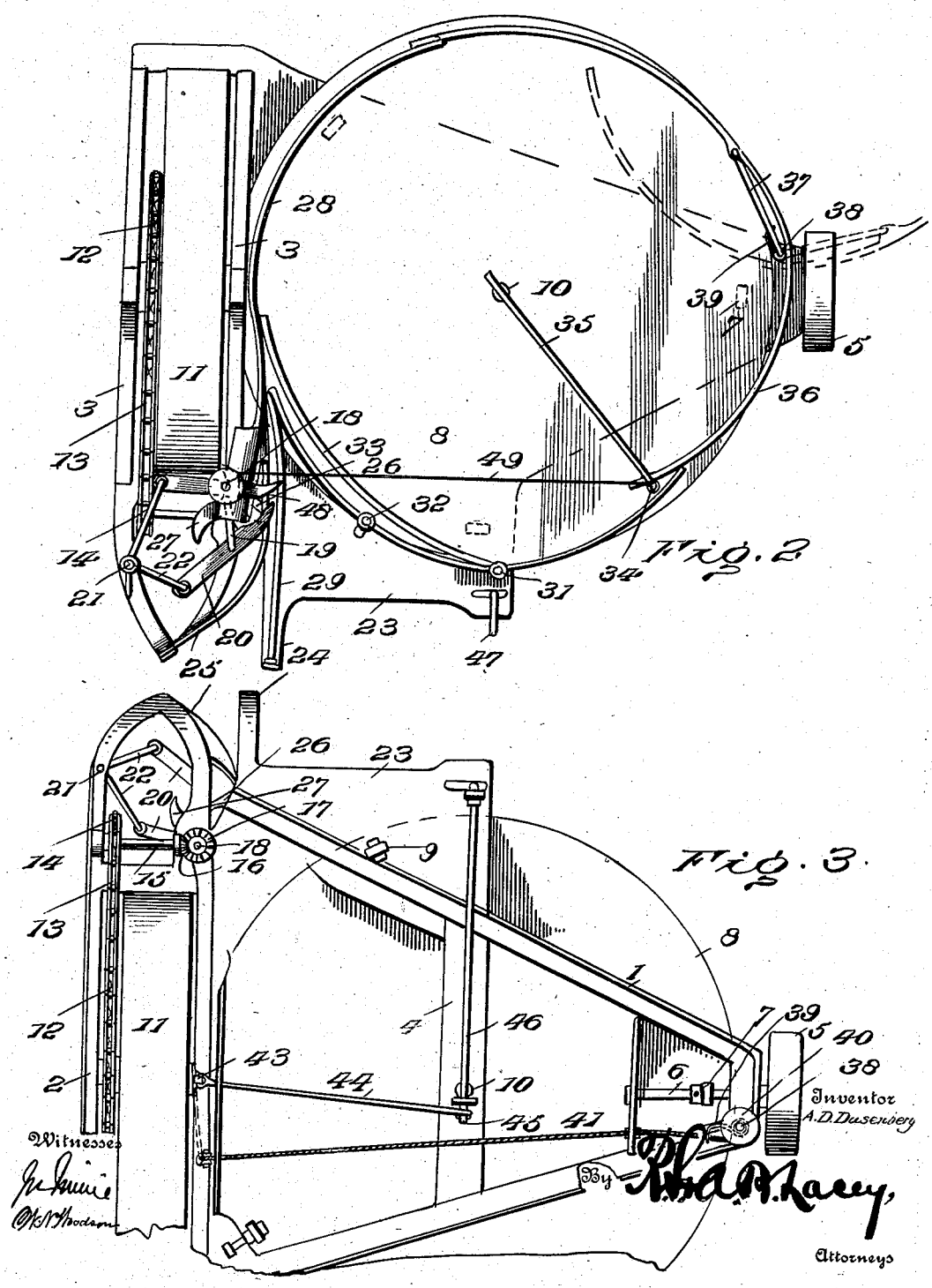

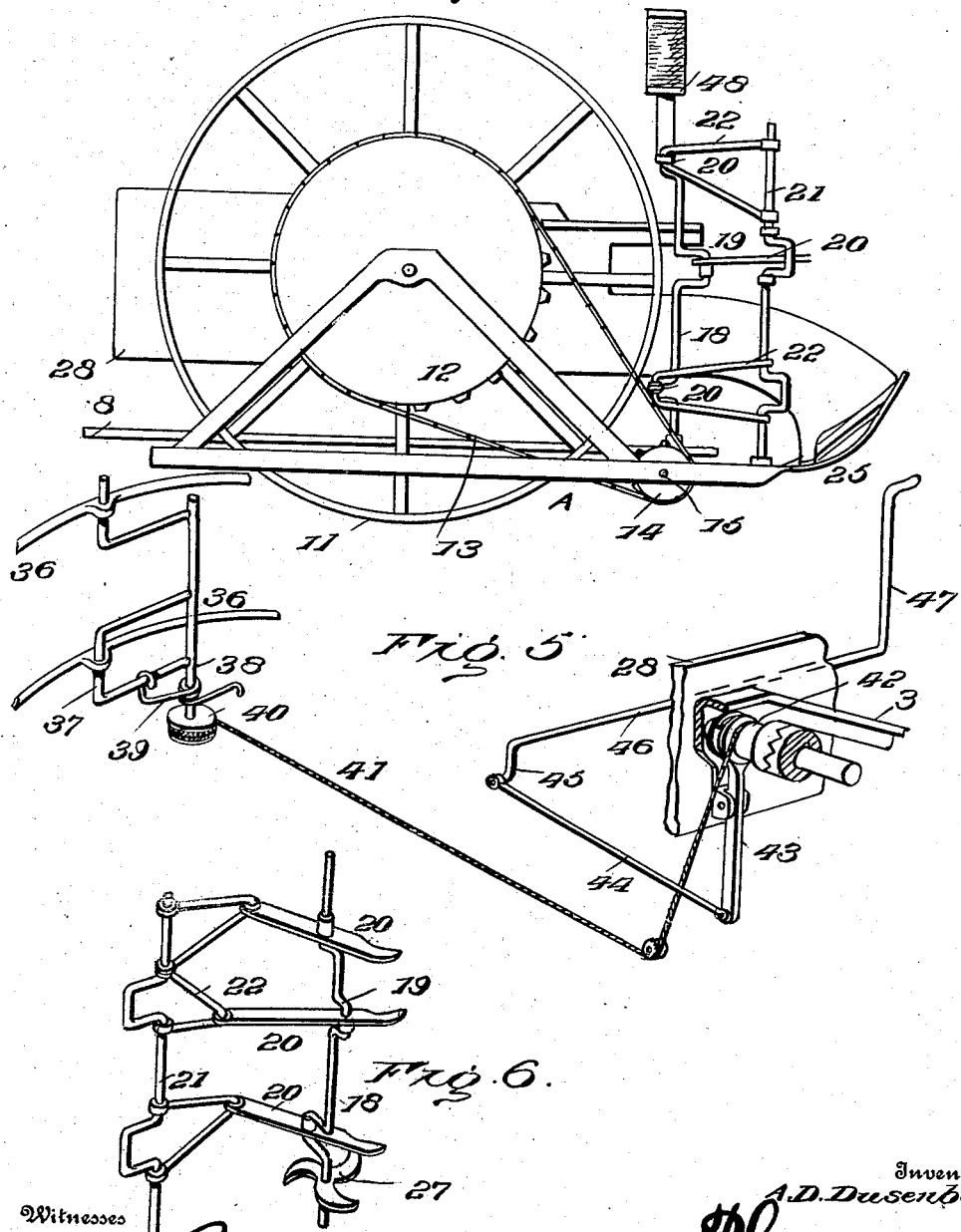

ALVEY D. DUSENBERY, OF IONIA, KANSAS.

CORN HARVESTER AND SHOCKER.

No. 893,313.   Specification of Letters Patent.   Patented July 14, 1908.

Application filed January 25, 1907. Serial No. 354,057.

*To all whom it may concern:*

Be it known that I, ALVEY D. DUSENBERY, a citizen of the United States, residing at Ionia, in the county of Jewell and State of Kansas, have invented certain new and useful Improvements in Corn Harvesters and Shockers, of which the following is a specification.

This invention relates to agricultural machinery designed for harvesting crops, such as grain and collecting and depositing the crop in shocks which are subsequently collected and stacked.

The invention provides a machine designed most especially for harvesting corn, or like stalky grain, the machine being propelled over the field and cutting the stalks which are collected upon a platform to form a shock and which shock is deposited upon the ground automatically and by power derived from the draft of the machine.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a corn harvester and shocker embodying the invention. Fig. 2 is a top plan view of the machine, the dotted lines indicating the position of the ejector when actuated to effect delivery of the shock from the rotary platform. Fig. 3 is a view of the machine inverted, a rear portion being broken away. Fig. 4 is a view in elevation as seen from the side of the machine provided with the drive wheel. Fig 5 is a perspective view of a portion of the guard serving as an ejector, the mountings for said guard and the actuating means for operating the guard. Fig. 6 is a detail perspective view of the packers, the rotary cutter and the means coöperating with the packers to give proper direction thereto.

Corresponding and like parts are referred to in the following description and indicated in all the views of the drawings by the same reference characters.

The frame-work is of substantial structure and may be of metal or wood, or a combination of metal and wood. In the preferred construction, the frame-work is composed of angle bars bolted or riveted together at their points of crossing and intersection.

The frame-work comprises oppositely inclined bars 1, longitudinal bars 2 and truss bars 3, the latter being arranged above the longitudinal bars 2 and connected at their ends thereto. The inclined bars 1 are arranged transversely of the machine and are connected intermediate of their ends by means of a longitudinal bar 4 and forming therewith a frame of approximately A form.

A ground wheel 5 is provided at the apex of the A frame and its shaft 6 is mounted in bearings applied to the said frame. The ground wheel 5 is fast to the shaft 6 and both rotate in unison. A wheel 7 is adjustable upon the shaft 6 and the rotary platform 8 rests thereon. Other wheels 9 are journaled to bearings applied to the said A frame and in conjunction with the wheel 7 support the platform 8. The wheel 7 constitutes a friction driver for the platform and effects rotation thereof when the machine is propelled over the field. By proper adjustment of the wheel 7 upon the shaft 6, the platform may be rotated at a greater or less speed proportionate to the forward movement of the machine. Any suitable means may be employed for securing the wheel 7 to the shaft 6 to cause the two to rotate as one part. The platform 8 is of circular outline and is mounted upon a stud 10 projected vertically from the longitudinal bar 4 of the A frame. The wheels 9 are idlers.

The drive wheel 11 is mounted in bearings applied to the truss bars 3 at their highest point and in conjunction with the ground wheel 5, supports the machine when in operation. A sprocket gear 12 is connected with the drive wheel 11 so as to rotate therewith and a sprocket chain 13 connects the sprocket wheel 12 with the sprocket pinion 14 fast to a transverse shaft 15 journaled in bearings near the front ends of the longitudinal bars 2. A bevel pinion 16 at the inner end of the transverse shaft 15 is in mesh with a bevel pinion 17 fast to the lower end of a vertical shaft 18 provided at intervals in its length with crank portions 19 upon which are mounted packers 20. A shaft 21 parallels the shaft 18, and links 22 connect the outer ends of the packers 20 with the shaft 21. The parts are so disposed that in the operation of the machine, the inner ends of the packers 20 which are of hook form travel rearward to advance the stalks to the platform and when the hooked ends reach the limit of their rearward movement, they clear the stalks and move forward until they reach an operative position, when they are again projected into the path of the stalks to again advance the same. The crank portions 19 of the shaft 18 have an angular arrangement so as to impart a progressive movement to the series of packers, whereby one packer is advancing while another is returning to an operative position. It will thus be understood that the stalks are continuously advanced to the platform in a positive manner.

A platform 23 is provided at the front of the machine and at one side of the rotary platform for the operator to stand upon. Guards 24 and 25 are located at one side of the stationary platform 23 and flare and curve upwardly at their front ends. The guards 24 and 25 are designed to operate upon the opposite sides of a row of stalks and give proper direction thereto in the operation of the machine to insure their being cut by the cutting mechanism. An inclined blade 26 extends across the space formed between the guards 24 and 25 and in conjunction with the rotary cutter 27 forms the cutting mechanism. The rotary cutter 27 is fast to the lower portion of the vertical shaft 18 and its blades, or cutters are of sickle, or hook form, and sweep over the stationary cutter 26 and sever the stalks by a shearing action.

A vertical wall 28 has its rear portion curved to conform to the periphery of the platform 8 and its front portion curved downward to meet the upwardly curved portion of the guard 25 to which it is secured. The front portion of the wall 28 is arranged at one side of the passage through which the stalks pass to the cutting mechanism and thence rearward to the rotary platform 8. The wall 28 may be of any formation. The rear end of the wall terminates a short distance from the rear of the platform 8 and to one side of a longitudinal vertical plane passed through the axis 10 of said platform. The opposite side of the passage is formed by rods 29 which are attached to the guard 24 at one end and extend rearward and thence laterally away from the plane of the drive wheel, or wall 28. The lateral portions 30 of the rods 29 are supported by rods, or bars 31 and 32 projected upward from the stationary platform 23. The supporting rods 33 are mounted upon the vertical rod 31 and extend over the rotary platform 8 and are curved in their length. The rods 33 support the shock during its formation and prevent the stalks from spreading upon the platform and hold them in upright position. While the rods 33 when in normal position are prevented from moving outward at their inner ends, yet they are adapted to move inward and forward to permit of the passage thereby of the radially disposed shock support carried by the rotary platform 8 and which shock support consists of a vertical rod 34 and inwardly extended rods 35. It will thus be understood that the shock is formed between the bars 33 and 35, the latter being fixed with reference to the platform 8 and movable therewith, and the rods 33 being supported upon the frame-work of the machine, the said rods being adapted to move in one direction until their extremities project over the axis of the platform to sustain the shock, and also adapted to be moved in the opposite direction to permit of the rod 34 passing thereby in the rotation of the platform 8 and immediately after the shock has been removed therefrom.

To prevent displacement of the shock from the platform 8 during its formation, a guard 36 is provided and is approximately of semi-circular form and is arranged to close the gap, or space provided between the guard 30 and the guard formed by the rear portion of the wall 28. The guard 36 together with the guards 30 and 28, extend around the platform 8 and retain the shock thereon. The guard 36 preferably consists of a number of rods, or bars, and is mounted upon the crank portions 37 of a vertical shaft 38 which is journaled in bearings at the outer end of the A frame. The end portions of the guard 36 overlap the respective ends of the guard members 28 and 30. In its normal position, the guard 36 engages with the shaft 38 which, together with the overlapping ends of the members 28, 30 and 36 hold the guard 36 in a given position. A spring 39 coöperates with the shaft 38 to hold it in normal position. A pulley 40 secured to the shaft 38 is connected by means of a cord, or rope 41, with a pulley 42 mounted upon the shaft of the drive wheel 11. The cord, or rope 41, is wound around the pulley 40, one or more times so that when drawn upon, it unwinds from the said pulley 40 and causes the shaft 38 to rotate with the result that the guard 36 is thrown rearward and pushes the shock from the platform 8 onto the ground. The pulley 42 is loose upon the shaft of the drive wheel and is movable towards and from the drive wheel so as to be thrown into or out of clutched engagement therewith. A shipper lever 43 is fulcrumed to the inner truss bar 3 and engages the pulley 42 and its lower end is connected by means of a rod 44 with a crank 45 at the inner end of a longitudinal shaft 46 mounted in bearings of the aforesaid A frame. The front end of the longitudinal shaft 46 is provided with a lever 47 which is located at one end of the platform 23 in convenient position for operation by the driver so as to throw the pulley 42 into and out of clutched engagement with the drive wheel. Upon operating the lever 47 and throwing the pulley 42 in engagement with the drive wheel, said pulley is rotated to wind up a portion of the rope, or cord 41, thereon and to unwind the same from the pulley 40 with the result that the shock is thrown from the platform 8. When the pulley 42 is disengaged from the drive wheel, the spring 39 reacting, returns the shaft 38 and the guard 36 to normal position.

A pulley 48 is located at one side of the passage formed between the guards 24 and 25 and the wire, or cord, wound thereon extends across said passage and is engaged with the vertical rod, or bar 34, and as the stalks are forced upon the platform, the cord or wire 49 is unwound from the pulley 48 and passes about the shock, and after the shock has reached the required size, it is bound by tying or securing the ends of the cord, or wire 49 after which the lever 47 is operated to throw the pulley 42 in clutched engagement with the drive wheel with the result that the guard 36 is moved and caused to act as an ejector to throw the shock from the platform 8 and effect delivery thereof upon the ground. The machine may be advanced over the field in any suitable way, the stalks entering between the guards 24 and 25 and passing between the walls 28 and 29, and as they reach the inner end of the passage, the stalks are severed by the cutting mechanism and are forced rearwardly upon the platform by means of the packers 20. As the stalks accumulate upon the platform they exert a pressure against the support 35 sufficient to cause rotation of the platform 8, the movement of the latter being further assisted by frictional contact of the wheel 7 therewith as hereinbefore stated. When the platform 8 has about completed a revolution, the shock has assumed the required size and is adapted to be bound. When the guard 36 is operated to push the shock from the platform, the support 33 moves rearward to admit of the shock clearing the platform. In the continued rotation of the platform to bring the support 35 in normal position, the pivoted support 33 moves out of the way to provide for the passage thereby of the vertical rod, or bar 34.

Having thus described the invention, what is claimed as new is:

1. In a harvester and shocker, the combination of a supporting frame, a rotary platform mounted upon the frame, a drive wheel, means for forming a shock upon the platform, a guard pivotally mounted upon the frame and adapted to eject the shock from the platform, and means for actuating the guard through the medium of the drive wheel.

2. In a harvester and shocker, the combination of a supporting frame, a rotary platform mounted upon the frame, means for forming a shock upon the platform, and a pivotally mounted guard operating to eject the shock from the platform.

3. In a harvester and shocker, the combination of a supporting frame, a cutting mechanism mounted upon the frame, a rotary platform mounted upon the frame, a shock support mounted upon the outer portion of the platform and terminating about in line with the axis thereof, a swinging guard for ejecting a shock from the platform, and a second shock support pivotally mounted upon the supporting frame and adapted to extend over the rotary platform to coöperate with the first mentioned shock support or to be swung away from the platform when ejecting the shock by means of the swinging guard.

4. In a harvester and shocker, the combination of a supporting frame, a rotary platform mounted upon the frame, means for forming a shock upon the rotary platform, a drive wheel, a guard for the platform adapted to be moved to eject a shock therefrom, and a clutch controlled mechanism for actuating the guard through the medium of the drive wheel.

5. In a harvester and shocker, the combination of a supporting frame, a rotary platform mounted upon the frame, a drive wheel, a cutting and feeding mechanism, means for transmitting motion from the drive wheel to the cutting and feeding mechanism, means for forming a shock upon the platform, a guard for the platform adapted to be moved to eject a shock therefrom, and means for actuating the guard through the medium of the drive wheel.

6. In a harvester and shocker, the combination of a supporting frame, a rotary platform mounted upon the frame, means for forming a shock upon the rotary platform, a drive wheel, a guard for the platform adapted to be moved to eject a shock therefrom, a spring normally holding the guard in position, and means for transmitting motion from the drive wheel to the guard for ejecting a shock from the platform.

7. In a harvester and shocker, the combination of a rotary platform, a supporting frame therefor, guards extended from the inner ends of the side walls of the passage through which the stalks, or grain, move to the platform, said guards extending in opposite directions and a third guard coöperating with the aforementioned guards to completely encircle the platform and retain the stalks, or grain, thereon during the formation of the shock, and means for imparting positive movement to said third guard to cause it to sweep across the platform and effect delivery of the shock therefrom.

8. In a harvester and shocker, the combination of a rotary platform, a supporting frame therefor, guards extended from the inner ends of the side walls of the passage through which the stalks, or grain, move to the platform, said guards extending in opposite directions, and a third guard coöperating with the aforementioned guards to completely encircle the platform and retain the stalks, or grain, thereon during the formation of the shock, a shaft having the said third guard connected therewith, a spring coöperating with the said shaft to normally hold the shaft and the third guard in normal position, and means for imparting a partial rotation to said shaft to cause the third guard to move across the platform and push the shock therefrom.

9. In a harvester and shocker, the combination of a main frame, provided with a cutting mechanism, a drive wheel for actuating the cutting mechanism, a rotary platform for receiving the stalks, or grain, in the formation of the shock, a guard for preventing displacement of the grain from the platform during the formation of the shock, a shaft having said guard connected therewith, a spring normally holding the shaft and guard in a given position, a pulley mounted coaxially with the drive wheel, a clutch between said pulley and drive wheel, a cord connecting said pulley with the shaft carrying the guard and means for throwing the pulley into and out of clutched engagement, whereby the guard is positively actuated to effect delivery of the shock from the platform.

In testimony whereof I affix my signature in presence of two witnesses.

ALVEY D. DUSENBERY. [L. S.]

Witnesses:
WILEY ALCORN,
WILLIAM H. HOLMES.